3,518,090
TREATMENT OF MILK TO IMPROVE ITS PROPERTIES FOR USE IN YEAST-RAISED BAKERY GOODS
Arthur M. Swanson, Madison, Wis., assignor to American Dry Milk Institute, Inc., Chicago, Ill., a corporation of Illinois
No Drawing. Filed Dec. 5, 1967, Ser. No. 688,026
Int. Cl. A23c 9/00
U.S. Cl. 99—56                                    5 Claims

ABSTRACT OF THE DISCLOSURE

Fluid milk is processed to improve its properties for use in yeast-raised bread and other bakery goods by adjusting the pH of the fluid milk to about 8.5–8.9 and heating the milk at the adjusted pH to inactivate reactive groups in the casein micelle of the milk, which groups interfere with obtaining good loaf volume and fine grain in the baked product. The pH of the milk is then readjusted to about its starting pH, and the milk then concentrated and dried to provide a final product for use in the baking process.

BACKGROUND AND SUMMARY

It is desired to employ as much non-fat dry milk in the baking of yeast-raised bread and other bakery goods in order to utilize the nutritional value and the flavor qualities of the milk, but certain factors relating to the loaf volume and fine grain structure thereof have limited the level of such use. In the continuous bread baking method, for example, the normal levels of six percent of the non-fat dry milk cannot be employed; in fact, levels above one to two percent have resulted in weak doughs and bread with poor grain structure and low loaf volume.

I have discovered that certain reactive groups in the micelle of the casein fraction of the milk are primarily responsible for the difficulty in obtaining good loaf volume and fine grain texture. I have further discovered that when the pH of the fluid skim milk, which is normally about pH 6.5–6.6, is adjusted to about 8.5–8.9 and the fluid milk heated at this adjusted pH in the range of 165–210° F. to inactivate the reactive groups in the casein micelle, the difficulty is overcome. The pH of the milk is then readjusted to about its starting pH, and the milk may then be concentrated in vacuum pans and spray-dried or roller-dried, etc. to provide the final product. The non-fat dried milk product thus obtained may be utilized in the continuous bread-making process at the normal level of six percent or higher, and it may be utilized in the baking of any of the yeast-raised bakery goods at even higher levels.

DETAILED DESCRIPTION

Tests reveal that the casein fraction of the fluid milk contains factors which are deleterious when the dried milk product is used in bread making. I believe that the micelle of the casein fraction contains reactive groups which normally resist heating and other treatment, but when subjected to a critically high pH together with heating become inactivated. By heating under alkaline conditions, the micelle seem to open up and expose the reactive groups which are then inactivated by the treatment. When the milk is subsequently readjusted to its original pH and the milk then concentrated and dried by conventional means, a product is obtained which may be employed at high levels in the baking of bread and like yeast-raised goods.

The fluid milk, which is preferably skim milk, is adjusted to a pH of about 8.5–8.9 and heated to about 165–210° F. to inactivate the reactive groups in the casein micelle. I prefer to employ a temperature in the range of about 180–195° F. Best results were obtained when the pH was adjusted to 8.7 and the milk heated to 185° F. for a period of 30 minutes.

At the preferred temperature range of 180–195° F. when the pH is in the range of 8.5–8.9, the time of heating is about 30 minutes. When the temperature is less than 180° F., the time of treatment should be increased to a small extent, and when the temperature is above 195° F., the time is preferably shortened so that, in effect, the heating is equivalent to heating at 185° F. at about 8.7 pH.

The concentrating of the fluid milk may be accomplished by conventional methods, as in a vacuum pan, and drying may be accomplished by conventional systems, such as roller drying and spray drying.

The non-fat dried milk product may be used in sponge and dough procedure, liquid ferment procedure, or in continuous baking procedure, the dried milk product being used at the level of six percent and above, with the bakery products having high loaf volume and fine texture.

In the adjustment of the pH from the normal pH of about 6.5–6.6 to about 8.5–8.9, any suitable alkaline earth metal hydroxide may be used, as, for example, sodium hydroxide, calcium hydroxide, etc. In adjusting the pH from 8.5–8.9 back to the starting pH, namely, about 6.5–6.6, any suitable organic or inorganic acid may be used, such as, for example, hydrochloric acid, lactic acid, etc.

Specific examples illustrative of the invention may be set out as follows:

Example I

Tests were made utilizing heat alone to determine the effect on the baking properties of non-fat dried milk. The fluid milk was treated at its normal pH and heated to the temperatures indicated in the table below and with the results shown.

The procedure for test baking was based on the method used in the laboratories of American Machine & Foundry. The brew was fermented at 85° F. (29.4° C.) for 2.25 to 2.5 hr. At the end of fermentation the pH was determined and the brew added to the Do-Corder with the mixer blades running at 100 r.p.m. The remaining flour, sugar, and oxidant were then added. The piston cover was placed in position and mixing was continued for 60 sec. The mixer was then switched to 210 r.p.m., and mixing was continued ½ a chart min. after the peak was passed. (Chart speed was set at 4 chart min. per min.) The bowl was removed and 19 oz. of dough was carefully scaled into a pan (10 by 4½ in. at the top, 9 by 3½ in. at the bottom, and 2¾ in. high) with the minimum amount of handling. The water circulating through the Do-Corder head was adjusted to about 98° F. so that the temperature of the dough at scaling was 104–105° F. After scaling, the dough was proofed at 100° F. (37.8° C.) and 95% R.H. The length of time was equal to the time required to proof the non-milk control, which was run daily, to a height one in. above the pan (measured by template). The dough was then baked in an electric oven at 435° F. for 22 min. After cooling for 1 hr. on the rack, the bread was sealed in plastic bags and judged the following day. This involved determining loaf volume by displacement, weighing, and giving the bread a quality score based on loaf volume, grain, and texture with a maximum of 100 points; 93 points was considered very good, and below 90 points unacceptable.

TABLE I.—EFFECT OF FOREWARMING AND CONCENTRATE HEATING AT 175° F. FOR 10 MINUTES ON BAKING PROPERTIES OF NFDM

| NFDM sample | Brew pH after 2.5 hours | Development time, sec. | Extensibility, mm. | Resistance to extension, B.U. | Ratio, R/E.10 | Adjusted loaf volume, cc./16 oz. | Bread score |
| --- | --- | --- | --- | --- | --- | --- | --- |
| No-milk control | 4.80±0.02 | 40±5 | 125 | 265 | 4.7±0.7 | 2,570±60 | 93±½ |
| Raw | 5.10 | 60 | 170 | 60 | 28.3 | 1,837 | 85 |
| Raw+ [1] | 5.09 | 88 | 180 | 90 | 20.0 | 2,190 | 87 |
| 145 | 5.11 | 60 | 165 | 80 | 20.6 | 1,898 | 85½ |
| 145+ | 5.12 | 75 | 185 | 90 | 20.5 | 1,892 | 86 |
| 165 | 5.08 | 60 | 135 | 195 | 6.9 | 2,313 | 90 |
| 165+ | 5.10 | 57 | 135 | 240 | 5.6 | 2,377 | 90 |
| 185 | 5.13 | 55 | 135 | 210 | 6.4 | 2,267 | 89 |
| 185+ | 5.10 | 49 | 130 | 260 | 5.0 | 2,254 | 90 |
| 205 | 5.10 | 45 | 125 | 170 | 7.3 | 2,207 | 88 |
| 205+ | 5.10 | 42 | 125 | 220 | 5.7 | 2,127 | 88 |

[1] +Indicates heat on the concentrate.

The extensibility as set out in the above table was measured in a Brabender Extensigraph which is employed to predict the baking properties of batch process dough.

The $E10/R$ ratio is the ratio of extensibility (E) times 10 over the resistance to extension (R). For example, slack or weak doughs show very low resistance to extension and generally very high extensibility, resulting in large $E.10/R$ ratios.

Even with the heating as shown in the above table, the non-fat dried milk reduced the loaf volume at least 200 cc. and resulted in bread three points or more lower than the control.

Example II

The process was carried out as described in Example I except that the pH of the fluid milk was adjusted prior to heating, as shown in Table II below. At the pH of 8.7 when the milk was heated for 30 minutes at 185° F., an excellent bread score was obtained.

TABLE II.—EFFECT OF HEATING AT 185° F. FOR 30 MINUTES AT ADJUSTED PH VALUES ON BAKING PROPERTIES OF SKIM MILK

| pH of heating | Brew pH after 2.5 hours | Development time, sec. | Extensibility, mm. | Resistance to extension, B.U. | Ratio, E.10/R | Adjusted loaf volume, cc./16 oz. | Bread score |
| --- | --- | --- | --- | --- | --- | --- | --- |
| No-milk control | 4.80 | 40 | 125 | 265 | 4.7 | 2,570 | 93 |
| 6.2 | 5.12 | 43 | 115 | 280 | 4.1 | 2,123 | 89 |
| 6.7 | 5.15 | 30 | 110 | 235 | 4.9 | 2,000 | 88 |
| 7.2 | 5.16 | 28 | 105 | 270 | 3.9 | 2,114 | 89 |
| 7.7 | 5.20 | 31 | 120 | 270 | 4.4 | 2,173 | 91 |
| 8.2 | 5.17 | 66 | 125 | 225 | 5.6 | 2,313 | 91½ |
| 8.7 | 5.20 | 63 | 135 | 260 | 5.2 | 2,483 | 92 |
| 9.2 | 5.28 | 49 | 150 | 210 | 7.1 | 2,282 | 90 |

As the pH of heating was increased, both loaf volume and bread score improved until the pH reached a maximum of 8.7. At this level, loaf volume was within 100 cc. of that of the control bread and the score was only one point less. Heating the skim milk at a higher pH level than 8.7 resulted in a poorer loaf of bread.

Example III

Tests were made to demonstrate that the heating of skim milk at adjusted pH levels improves baking properties of the caseins. Casein solutions heated at pH levels above the normal pH of milk improved loaf volume and score to a greater extent than heat treatments alone. Casein solutions at adjusted pH values were heated at 185° F. for 30 minutes, with the results shown in Table III.

TABLE III.—EFFECT OF HEATING AT 185° F. FOR 30 MINUTES AT ADJUSTED PH VALUES ON BAKING PROPERTIES OF CASEIN SOLUTIONS

| pH of heating | Brew pH after 2.5 hours | Development time, sec. | Extensibility, mm. | Resistance to extension, B.U. | Ratio, E.10/R | Adjusted loaf volume, cc./16 oz. | Bread score |
| --- | --- | --- | --- | --- | --- | --- | --- |
| No-milk control | 4.80 | 40 | 125 | 265 | 4.7 | 2,570 | 93 |
| 6.2 | 4.80 | 39 | 140 | 170 | 8.2 | 2,014 | 90 |
| 6.7 | 4.88 | 27 | 135 | 230 | 5.9 | 2,040 | 88 |
| 7.2 | 4.85 | 30 | 115 | 290 | 4.0 | 2,155 | 89 |
| 7.7 | 4.90 | 30 | 120 | 255 | 4.7 | 2,304 | 90 |
| 8.2 | 4.90 | 27 | 105 | 290 | 3.7 | 2,386 | 92½ |

At pH 8.2, grain and texture were equal to those of the no-milk control loaf, and the bread was scored only one-half point less than the control because loaf volume was slightly lower.

From the foregoing examples, it is shown that the adjusting of the pH of skim milk to the alkaline side of normal and then heating the same improves considerably the baking properties of the final dried product and permits the addition of increased amounts of non-fat dried milk in the preparation of yeast-raised bakery goods.

While in the foregoing specification I have set forth examples in considerable detail for the purpose of illustrating embodiments of the invention, it will be understood that such details may be varied widely by those skilled in the art without departing from the spirit of my invention.

I claim:

1. In a process for treating fluid milk to improve its properties for use in yeast-raised bakery goods, in which the micelle of the casein fraction of the milk contains reactive groups which inhibit loaf volume in baking, the steps of adjusting the pH of the milk to about 8.5–8.9, heating the milk at the adjusted pH to a temperature in the range of about 165–210° F. to inactivate said reactive groups of the micelle, and readjusting the pH to about its original pH.

2. The process of claim 1 in which the temperature is about 180–195° F.

3. The process of claim 1 in which said milk after readjustment of the pH is concentrated and dried.

4. In a process for treating fluid milk to improve its properties for use in yeast-raising bakery goods, the steps of adjusting the pH of the milk to about 8.5–8.9, heating the milk at the adjusted pH to a temperature in the range of about 180–195° F. for about 30 minutes, readjusting the pH to about its original pH, and drying the milk.

5. The process of claim 4 in which the milk is fluid skim milk and the pH is adjusted to about 8.7 and the milk heated at the adjusted pH to about 185° F. for about 30 minutes.

References Cited
UNITED STATES PATENTS
2,671,729  3/1954  Fear et al. _____ 99—56

OTHER REFERENCES
Stamberg et al., Cereal Chemistry XIX July 1942 (pp. 507–517).

Jenness et al., Principles of Dairy Chemistry, John Wiley & Sons Inc., N.Y., 1959 (pp. 334–339).

Webb et al., Fundamentals of Dairy Chemistry, The Avi Publ. Co., Inc., Westport, Conn., 1965 (pp. 540–545).

LIONEL M. SHAPIRO, Primary Examiner

D. M. NAFF, Assistant Examiner

U.S. Cl. X.R.

99—54, 90, 212